United States Patent [19]
Donovan et al.

[11] 3,738,594
[45] June 12, 1973

[54] LIFT CONTROL MECHANISM

[75] Inventors: Bradford P. Donovan; Lorin A. Wood, both of Lakewood, Calif.

[73] Assignee: McDonnell Douglas Corporation, Santa Monica, Calif.

[22] Filed: Aug. 16, 1971

[21] Appl. No.: 171,989

[52] U.S. Cl. ............ 244/76 R, 244/77 R, 244/83 R
[51] Int. Cl. ...................... B64c 13/18, B64c 13/30
[58] Field of Search ..................... 244/77 F, 77 SE, 244/77 R, 76 R, 76 A, 75 R, 83 R, 83 A, 83 C, 83 E, 85, 89, 90 R, 90 A, 81, 82; 74/470, 479; 318/580, 583, 584, 590

[56] References Cited
UNITED STATES PATENTS
3,633,435   1/1972   Farr ..................................... 74/470

*Primary Examiner*—Duane A. Reger
*Assistant Examiner*—Barry L. Kelmachter
*Attorney*—Walter J. Jason, Donald L. Royer, Geroge W. Finch et al.

[57] ABSTRACT

A controlling mechanism for a direct lift control system which is utilized primarily during the landing phase of aircraft flight to reduce the response time of the aircraft to longitudinal or pitch commands. The system incorporates modulated spoilers to effectuate augmented vertical control of the flight path of the aircraft without necessarily changing the pitch attitude thereof. When the aircraft is preparing to land and the flaps are placed at the desired landing flap angle, the mechanism raises the spoilers on each wing symmetrically to a predetermined bias position. The mechanism thereafter causes the spoilers to operate up and down from this bias position in response to elevator commands generated either manually by the pilot or automatically by the autopilot. The mechanism also includes means to disengage the system automatically during stalls, go-arounds, landing rollout, or manually whenever the pilot desires.

14 Claims, 1 Drawing Figure

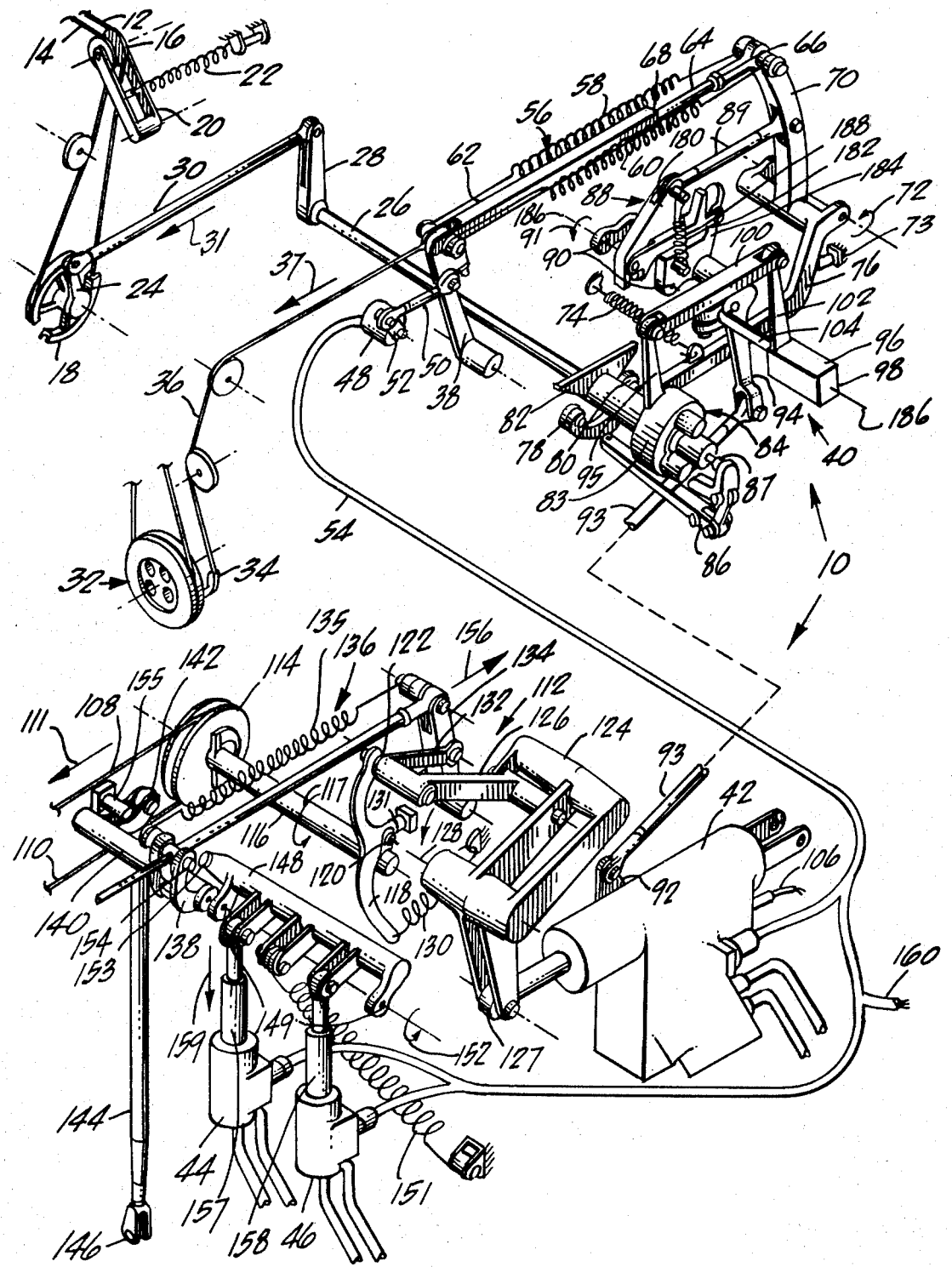

LIFT CONTROL MECHANISM

BACKGROUND OF THE INVENTION

The increasing size of aircraft unavoidably results in substantial increases in the pitching inertia thereof. This increased pitching inertia increases the time required to obtain a change of lift in response to an elevator input since normally elevator control surfaces are used to alter the flight path by pitching the aircraft to change angle of attack and lift coefficient of the wing. It has been found that conventional elevator control surfaces must be enlarged to an undesirable extent to obtain the required response to maintain large aircraft on the desired vertical path. The need for a relatively quick response to elevator inputs is most significant while at low airspeed on approach, during flare and at touchdown. Since glide path control, flare and touchdown require varying wing lift or, more specifically, changes in load factor, means must be provided which assure a favorable load factor response to control inputs as a function of time. It has been found that properly controlled, the spoilers installed on most larger aircraft are capable of keeping the response time of the aircraft short enough to minimize pilot work load and to provide a well controlled platform for the autopilot. The heretofore unsolved problem has been to provide a reliable device to properly control the position of the spoilers which does not degrade but in fact actually enhances the safety of the aircraft.

SUMMARY OF THE INVENTION

The present direct lift control mechanism controls the position of the wing spoilers in correspondence to elevator control movements and thereby augments the response of the aircraft to elevator commands. When the flaps of the aircraft are extended, energizing means in the mechanism activate the mechanism and raise the spoilers to a predetermined bias position. Thereafter, pitch control signals from either the pilot or the autopilot through the normal elevator control system are connected to an electrohydraulic actuator by washout means. The washout means make the pitch control signals rate sensitive so that very rapid pitch control movements result in larger actuator inputs than slower movements and so that very slow pitch control movements result in no actuator input.

Bias means are included in conjunction with the washout means so the input to the actuator is gradually returned to the bias position after a pitch control movement has been completed. The actuator responds to the inputs fed to it by producing mechanical outputs which reposition the spoilers of the aircraft in proportion to the inputs. An up elevator command retracts the spoilers, increasing wing lift and causing an upward departure from the previous flight track while a down elevator command extends the spoilers, decreasing wing lift and causing a downward departure from the previous flight track. In automatic flight, electrical signals are supplied directly to the actuator from the autopilot. The electric signals cause the actuator and spoilers to operate in response to pitch commands in the same way they respond to mechanical commands with means within the autopilot generating the bias and washout thereof. Manual override means under the control of the pilot are provided to permit deactivation of the entire mechanism when desired. Means can also be included for automatic disengagement of the mechanism in response to a stall warning, a go-around signal or automatic deployment of ground spoilers.

It is therefore an object of the present invention to provide a direct lift control device which is primarily mechanical because mechanical devices have been proven to have better reliability than electrohydraulic or all electric devices for a given function.

Another object is to provide means which allow precise glide path control of a large aircraft even at relatively low airspeeds.

Another object is to increase the response of an aircraft to elevator control commands at low airspeeds.

These and other objects and advantages of the present invention will become apparent after considering the following detailed specification which covers a particular embodiment thereof in conjunction with the accompanying drawing.

BRIEF DESCRIPTION OF THE DRAWING

The FIGURE is a simplified perspective view of a direct lift control mechanism embodying the principles of the present invention.

DESCRIPTION OF THE PRESENT EMBODIMENT

Referring to the drawing more particularly by reference numbers, number 10 refers to a direct lift control mechanism constructed according to the present invention. When energized, the mechanism 10 modulates the spoilers on the aircraft in accordance with elevator inputs fed thereto. The elevator inputs are fed to the mechanism 10 by cables 12 and 14 which are directly connected to the elevator control system. The cables 12 and 14 make a 90° change of direction over pulleys 16 and attach to a sector member 18. The pulleys 16 are held in a pulley bracket 20 which is spring loaded by spring 22 to regulate the tension of the cables 12 and 14 in a predetermined range. The spring loaded pulley bracket 20 is used to absorb cable length variations due to thermal expansion and contraction of the airframe and also to serve as an override to protect the elevator system in case the mechanism 10 jams. Otherwise the jamming of the mechanism 10 might undesirably restrict the elevator control system of the aircraft.

The sector member 18 and an arm 24 attached thereto rotate in response to movement of the cables 12 and 14. The rotation of the sector member 18 is transferred to an input torque tube 26 by means of an arm 28 connected to the torque tube 26 and a rod 30 linking the outer ends of the arms 24 and 28. Motion of the rod 30 in the direction shown by the arrow 31 is caused by an elevator control command for downward movement of the elevator trailing edge and decreased wing lift. The motion of the rod 30 in the direction of the arrow 31 therefore will tend to cause extension of the spoilers when the mechanism 10 is energized as will be discussed hereinafter.

The mechanism 10 is sequentially energized by any suitable means including an input from the flap system of the aircraft. The flap input is obtained from an aileron lockout 32 which is described in co-pending U.S. Pat. application, Ser. No. 138,087, entitled AILERON CONTROLS by Bradford P. Donovan which was filed 28 Apr. 1971 and is assigned to Applicants' assignee. The aileron lockout 32 operates in synchronism with the flap system and at a predetermined extension of the flaps. The lockout 32 causes an arm 34 and a cable 36 connected to the lockout 32 to move in the direction shown by the arrow 37. This occurs when the flaps are almost entirely extended. The cable 36 is connected to rotate a pivoted lever 38 which first causes mechanical engagement of the mechanism 10 and then electrical energization thereof. The mechanical engagement and electrical energization are sequenced so that a washout/bias center mechanism 40 and a mechanical input to an electrohydraulic actuator 42 are in the desired spoiler bias position prior to electrical energization of the actuator 42. The electrical energization also activates engage actuators 44 and 46 which operate to unlock the output of the mechanism 10 as will be described hereinafter.

The electrical engagement of the mechanism 10 is controlled by a rotary flap switch 48 which is connected to the pivoted lever 38 by a rod 50 and an arm 52. The switch 48 electrically energizes the actuators 42, 44 and 46 by means of an electrical line 54 which runs therebetween.

The washout/bias center mechanism 40 is connected to the arm 38 by means of a push-pull type spring override 56 which absorbs the flap input travel in excess of that required to produce the mechanical engagement to enable the electrical engagement. The spring override includes two parallel preloaded springs 58 and 60, a hollow member 62 and a rod 64 which is slidably mounted in the hollow member 62. The rod 64 includes a collar 66 which is held in abutment with the end 68 of the hollow member 62 by the preloaded springs 58 and 60 when the flaps are in the retracted position. The override 56 is shown with the relative positioning of the member 62 and the collar 66 caused by full flap extension with the springs 58 and 60 in a fully stretched condition. The springs 58 and 60 pull a pivoted lever 70 in the direction indicated by the arrow 72 against a bias stop 73 to the position shown.

The lever 70 is biased in the direction opposite to the arrow 72 by a spring 74 which is connected between structure and a centering arm 76 which is part of the lever 70. The bias of the spring 74 normally causes centering rollers 78 and 80 on the end of the arm 76 to bear against a centering cam 82 connected to the output side 83 of an input clutch 84 to lock the output side 83 in its centered position. Rotation of the arm 76 in the direction of arrow 72 caused by the flap extension, retracts the clutch centering rollers 78 and 80 to the position shown and unlocks the clutch output 83. As the centering roller end of the arm 76 moves away from the cam 82, clutch engagement linkage 86 is contacted thereby and operated to depress a plunger 87 in the end of the clutch 84 which engages the clutch 84 to the aforementioned input torque tube 26 as the rotation of the arm 76 continues into the stop 73.

The pivoted lever 70 is also connected to a centering spring mechanism 88 by a rod 89. Typical centering spring mechanisms which can be used are shown in U. S. Pat. No. 3,633,435 entitled BI-DIRECTIONAL FORCE OVERRIDE by Alton E. Farr and such a mechanism 88 is discussed hereinafter. Rotation of the lever 70 in the direction of the arrow 72 rotates the centering spring mechanism 88 as an assembly about its pivots 90 in the direction of arrow 91 to establish a bias center position. The centering spring mechanism 88 is connected to an input arm 92 of the actuator 42 by means of a rod 93 which extends between the output arm 94 of the centering spring mechanism 88 and the input arm 92. The rotation of the mechanism 88 to the bias position causes the actuator 42 to reposition the actuator piston therein to extend the spoilers to the bias position mentioned above. This completes the engagement of the washout/bias center mechanism 40 for the landing phase of the flight.

When the clutch 84 is engaged, rotations of the elevator input torque tube 26 are transferred therethrough to move an output arm 95 connected to the clutch output side 83. The arm 95 is connected to the housing 96 of a washout viscous damper 98 by means of a link 100 and an arm 102 connected to the housing 96. Therefore, an elevator input rotates the clutch output side 83 which in turn is operatively connected to rotate the housing 96 of the viscous damper 98. The viscous damper 98 rotationally drives its output shaft 104 through a fluid film to make the output rate sensitive. The output shaft 104 transmits the rate sensitive output to the output arm 94 of the centering mechanism 88 to stress it from its bias center position. The actuator 42 and the spoilers normally follow this motion. If the elevator input is applied and then held, the centering spring mechanism 88 back drives the viscous damper 98 and slowly returns the output arm 94 to its bias centered position and the actuator 42 and spoilers follow. This washing out of the elevator input command occurs logarithmically at a rate determined by the spring force of the mechanism 88 and the damping coefficient of the viscous damper 98.

At the completion of each landing approach with a landing or a go-around, the mechanism 10 is preferably de-energized and the rollers 78 and 80 re-engaged with the cam 82 to center the viscous damper 98 and the clutch 84. This is desirable since over a period of time, substantially longer than the normal approach time, it is possible for the viscous damper 98 and the clutch 84 to drift together in one direction until no further travel in one direction is available for elevator input transfer to the centering spring mechanism 88.

The gain of the elevator input system, that is, the ratio of spoiler deflection to elevator deflection is preferably near 1:1 assuming no damper slippage, although it can be adjusted to other ratios as desired. The ratio is an average ratio for the total spoiler travel and since spoiler operation is in most instances non-linear, there is some variation from the nominal gain with spoiler position.

A method of compensation for the difference in total travel of the spoilers and the elevator is required since the total available elevator travel can be much greater than the available spoiler travel. Therefore, elevator inputs in excess of spoiler travel are absorbed by slipping the clutch 84 when the torque thereacross reaches a predetermined breakout force. This breakout force as reflected to the pilot's control column is relatively low so it can be masked by the elevator load feel associated with powered control systems or aerodynamic forces when manual controls are employed. The clutch breakout is therefore not usually felt by the pilot.

The actuator 42 is used to amplify the command signals sent thereto whether they come from the washout/bias center mechanism 40 or directly from the autopilot. It also serves to isolate the washout/bias center mechanism 40 from spoiler lateral control and output force limiter override loads which otherwise might back drive and overpower the mechanism 40. The actuator 42 is usually a tandem actuator which is driven by two or more hydraulic systems so that the actuator 42 remains operable if a hydraulic system fails. The actuator 42 is conventionally controlled by a control valve and position feedback summing linkage not shown. The valve receives mechanical commands from the manual elevator system inputs through the washout/bias center mechanism 40 and rod 93 which connects the mechanism 40 to the actuator input arm 92 as aforesaid. During autopilot controlled flight, the manual input arm 92 is locked and the actuator commands are received from an autopilot modulating piston therein which is controlled by electrical autopilot inputs on line 106. The autopilot inputs are similar to the mechanical inputs, having bias and washout portions generated electrically by the autopilot. Mechanical inputs from the elevator system during autopilot controlled flight are absorbed by slippage of the clutch 84. During manual flight the autopilot modulating piston locks in a null position and the manual input arm 92 is unlocked.

A manual disengage lever which connects to the mechanism 10 by means of cables 108 and 110 is provided in the cockpit of the aircraft so the pilot can engage and disengage the mechanism 10 as desired. The normal position of the disengage lever is "engaged" with cable 108 moved in the opposite direction to the direction shown by arrow 111. Thus on normal flights, operative direct lift control is automatically a function of flap position. If for some reason the pilot wishes to fly without direct lift control, for training purposes or because of direct lift control malfunction, he can deactivate the mechanism 10 by moving the lever to the disengaged position which moves the cable 108 in the direction of arrow 111.

The cables 108 and 110 are connected to a lockout mechanism 112 by means of a drum 114, and a shaft 116 connected thereto. Lost motion can be incorporated into the drum 114 and shaft 116 to reduce the drum rotation required and therefore avoid excessive disengage lever travel. Movement of the disengage lever to the "disengaged" position causes rotation of the shaft 116 in the direction shown by arrow 117 and causes a swinging link 118 pivotally connected to the shaft 116 by an arm 120 to move from the position shown to one with the shaft 116 rotated approximately 180°. An upper end pivot 122 of the swinging link 118 is connected to a lockout crank 124 by an arm 126. The crank 124 is connected to the output arm 127 of the actuator 42. When the arm 127 extends or retracts, it rotates the crank 124 about its pivotal axis 128. When the shaft 116 is rotated in the direction of arrow 117, the pivot 122 moves in the direction of arrow 129 into alignment with the axis 128 of the crank 124 which reduces the effective crank output drive radius to zero. Since the pivot 122 is thereafter "on center" with the axis 128 so long as the lockout mechanism 112 is in its disengaged condition, the actuator 42 is free to idle and move to any position, with the output arm 127 thereof effectively disconnected and the "downstream" portion of the mechanism 10 locked in a predetermined position as will be described. This type of disconnect is desirable because it is effective without physically interrupting the linkage and thus a proper phase relationship between the components of the mechanism 112 is retained for future engagements. When the shaft 116 is rotated to re-engage the lockout mechanism 112, the end pivot 122 of the swinging link 118 is moved back to the position shown. A preloaded spring 130 is connected to the swinging link 118 to assure a complete shift of swinging link 118 back against a stop 131 and into the engaged position.

The actuator output is thereafter transferred from the pivot 122 of the swinging link 118 to a spoiler lateral control mixer which mixes the output of the mechanism 10 with other inputs to control the spoilers. The mixer does not form a part of this invention. This transfer is accomplished through a link 132, a lever arm 134, the preloaded spring 135 of a force limiter 136, an output crank 138, a shaft 140, an arm 142 and an output rod 144, the end 146 of which connects to the mixer.

An auto disengage arm 148 mounted for rotation by pivots 149 is used to provide a movable stop to zero the output of the mechanism 10. The arm 148 which is biased by a spring 151 in the direction of arrow 152 includes an abutment surface 153 which is engagable with an extension 154 of the output crank 138. When the abutment surface 153 is engaged with the extension 154, the bias of the spring 151 on the arm 148 is sufficient to completely overpower the force limiter 136 and to hold the arm 142 against a stop 155 which results in a zero output position of the output rod 144. The spring loaded force limiter 136 is similar to the spring override 56 described above and it allows motion of the arm 134 through stretching of the spring 135 in the direction shown by the arrow 156 even through the output crank 138 is clamped in the zero output position by the auto disengage arm 148. However, when the lockout mechanism 112 is in its alternate, disengage position with the lever arm 134 locked at the angle shown in the FIGURE, the force limiter 136 acts like a solid rod to push the arm 138, thereby maintaining the arm 142 of shaft 140 against the stop 155 so a zero output position of the output rod 144 is maintained.

The outputs 157 and 158 of the engage actuators 44 and 46 are connected to rotate the arm 148 in the opposite direction to that of arrow 152 so the abutment surface 153 moves to the position shown in the FIGURE clear of the extension 154. This normally happens when the direct lift control mechanism 10 is completely activated by the lowering of the flaps far enough to cause electric energization. The hydraulic engage actuators 44 and 46 are usually operated by solenoid valves which are energized by an electrical signal from the flap switch 38. When de-energized, the solenoid valves in the actuators 44 and 46 are spring loaded to connect the extend sides of the actuators 44 and 46 to return which allows the spring 151 to move the actuator outputs 157 and 158 in the direction of arrow 159 to disengage the mechanism 10. The two actuators, 44 and 46, are connected to separate hydraulic systems and they enable continued operation of the direct lift control mechanism 10 when one of the hydraulic systems is lost since either actuator 44 or 46 is capable of overcoming the spring 151 to maintain the mechanism 10 in the engaged position.

Go-around, stall warning, and ground spoiler signals are connected to interrupt the solenoid valve electrical power normally fed to the actuators 44 and 46 by means of connection 160. The power interruption causes the inactivation of the actuators 44 and 46 causing the disengage arm 148 to collapse the actuator outputs 157 and 158 and to reclamp the output crank 138 in the zero spoiler or disengage position.

Discussing the centering spring mechanism 88 in greater detail, the mechanism 88 includes a first link 180 with its upper end pivotally connected to the rod 89 and its lower end pivotally connected to an end of a second link 182. The other end of the link 182 is pivotably connected to one end of an output link 184 which includes the output arm 94. The output link 184 is mounted for rotation by the pivots 90 about an axis 186 and the output shaft 104 of the viscous damper 98 is connected to the output link 184 on this same axis 186. The output link 184 is further interconnected to the first link 180 by one or more springs 188 which act to preload the first and output links 180 and 184 against the second link 182 to thereby produce a centering force which must be overcome by the force transmitted through the viscous damper 98 when relative movement is produced between the output arm 94 and the rod 89. Since the viscous damper 98 can only momentarily maintain such a force, the deflection of the output arm 94 away from the centered position always tends to wash back to the centered position as aforesaid. If the input movement fed to the damper 98 is slow enough, sufficient force is never transmitted to the mechanism 88 to overcome the preloading of the spring 188 and no output change is produced.

Thus, there has been shown and described a novel direct lift control mechanism which fulfills all the objects and advantages sought therefore. Many changes, alterations, modifications and other uses and applications of the subject mechanism will become apparent to those skilled in the art after considering this specification and the accompanying drawing. All such changes, alterations and modifications which do not depart from the spirit and scope of the invention are deemed to be covered by the invention which is limited only by the claims which follow.

What is claimed is:

1. A mechanism for producing spoiler deflection outputs from elevator control system inputs for direct lift control of an aircraft, said mechanism including:
   elevator input means to connect said mechanism to the elevator control system;
   means to activate said mechanism in response to a predetermined condition of the aircraft;
   spring centering means including spoiler deflection output means for producing spoiler deflection outputs;
   linkage means to move said spring centering means from a first position thereof which produces a zero deflection spoiler output to a second position thereof which produces a predetermined center spoiler deflection output in response to said activation means; and
   rate sensitive means connected to said elevator input means and to said spring centering means, said rate sensitive means momentarily displacing said spoiler deflection output means of said spring centering means away from said predetermined center spoiler output producing position, the displacement being dependent upon the amount and rate of change of the elevator input.

2. The mechanism defined in claim 1 wherein said rate sensitive means include:
   viscous damper means which are connected to displace said spoiler deflection output means of said spring centering means in response to elevator control inputs, said spring centering means being capable of back driving said viscous damper means after an input to return said spoiler deflection output means to said position producing said predetermined center spoiler output.

3. The mechanism defined in claim 1 including:
   lockout means to controllably clamp said spoiler deflection output means in a position to produce a zero deflection spoiler output; and
   means to releasably connect said lockout means to said spoiler deflection output means.

4. The mechanism defined in claim 1 wherein:
   said activation means are operatively connected to respond to a predetermined extension of the flaps of the aircraft to activate said mechanism.

5. The mechanism defined in claim 1 wherein said spring centering means include:
   a first link having a first end portion connected to said linkage means to hold said first link and a second end portion;
   an output link connected for rotation about an axis, said output link being connected to receive inputs from said rate sensitive means and to produce said spoiler deflection outputs;
   a second link having a first end portion pivotally connected for rotation to said second end portion of said first link and a second end portion pivotally connected for rotation to said output link, said second link being in abutment with said first link and said output link to restrict rotation therebetween in predetermined directions; and
   at least one centering spring connected between said first and output links to exert a predetermined force across said second link; whereby said spring can be momentarily overcome by inputs from said rate sensitive means at which time said output link pivots with respect to said first link to produce a spoiler deflection output other than said predetermined center spoiler deflection output, the action of said spring gradually back driving said rate sensitive means to return said output link to the position where said predetermined center spoiler deflection output is produced.

6. The mechanism defined in claim 1 including:
   force sensitive means for controllably connecting said elevator input means to said rate sensitive means, said force sensitive means enabling the disconnection of elevator inputs of magnitudes greater than can be accepted by said rate sensitive means and said spring centering means.

7. The mechansim defined in claim 6 wherein:
   said activation means include means to hold said force sensitive means in a predetermined position when said mechanism is in a deactivated condition and means to control the engagement of said force sensitive means when said mechanism is activated.

8. The mechanism defined in claim 1 including:
   actuator means to amplify the output of said spoiler deflection output means; and
   means controlled by a manual input to disconnect said amplified output from deflecting the spoilers.

9. The mechanism defined in claim 8 wherein said actuator means include:
   means responsive to electrical autopilot signals to produce amplified spoiler deflection signals therefrom and to lock out the output of said spoiler deflection output means.

10. Means for producing direct lift control outputs for controlling the position of spoilers on an aircraft, said means including:
  means to predeterminately produce direct lift control signals;
  actuator means including mechanical output means connected to respond to said direct lift control signal by producing mechanical output signals in correspondence to said direct lift control signals at said mechanical output means; and
  safety means to operatively connect said mechanical output signals to the spoilers, said safety means including manually controllable means to disconnect said mechanical output signals from the spoilers, lockout means to controllably clamp said mechanical output signals fed to the spoilers to zero deflection position, and means to releasably connect to said mechanical output means so that said mechanical output means can move when said lockout means are clamping said mechanical output signals.

11. The means defined in claim 10 wherein said means to predeterminately produce direct lift control signals include:
  autopilot means which generate electrical direct lift signals; and
  mechanical means which produce mechanical direct lift signals, said actuator means being selectively controlled by either said electrical or mechanical direct lift signals.

12. The means defined in claim 11 wherein said mechanical means which produce mechanical direct lift signals include:
  elevator input means to connect said mechanical means to the elevator control system of the aircraft;
  centering means including means for producing said mechanical direct lift signals;
  actuation means to controllably move said centering means from a first position thereof which produces a no spoiler deflection mechanical direct lift signal to a second position which produces a predetermined spoiler deflection mechanical direct lift signal; and
  rate sensitive means controllably connected to said elevator input means and said centering means, said rate sensitive means being capable of momentarily displacing said centering means from said second position thereof to modulate said predetermined spoiler deflection mechanical direct lift signal with the amount and rate of change of the input from the elevator control system to said elevator input means.

13. The means defined in claim 12 wherein said rate sensitive means include:
  a viscous damper operatively connected between said elevator input means and said centering means.

14. The means defined in claim 12 wherein said actuation means include:
  a clutch which controllably engages said elevator input means with said rate sensitive means, said clutch including clutch positioning means which maintain said clutch and connected rate sensitive means in a predetermined position until said centering means are moved to said second position, and torque sensitive means which operatively disengage said elevator input means from said rate sensitive means when a predetermined torque is applied across said clutch.

* * * * *